United States Patent
Okugawa et al.

(10) Patent No.: US 10,814,717 B2
(45) Date of Patent: Oct. 27, 2020

(54) AIR GUIDING UNIT AND COOLING MODULE

(71) Applicant: DENSO CORPORATION, Aichi (JP)

(72) Inventors: Shingo Okugawa, Aichi (JP); Ken Mutou, Aichi (JP); Akihiro Maeda, Aichi (JP); Tomomi Okuyama, Aichi (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 414 days.

(21) Appl. No.: 15/740,391

(22) PCT Filed: Jul. 7, 2016

(86) PCT No.: PCT/JP2016/070131
§ 371 (c)(1),
(2) Date: Dec. 28, 2017

(87) PCT Pub. No.: WO2017/010396
PCT Pub. Date: Jan. 19, 2017

(65) Prior Publication Data
US 2018/0264932 A1 Sep. 20, 2018

(30) Foreign Application Priority Data

Jul. 10, 2015 (JP) .................................. 2015-138450

(51) Int. Cl.
*B60K 11/08* (2006.01)
*B60K 11/04* (2006.01)
(Continued)

(52) U.S. Cl.
CPC .............. *B60K 11/08* (2013.01); *B60K 11/04* (2013.01); *F01P 5/02* (2013.01); *F01P 11/10* (2013.01);
(Continued)

(58) Field of Classification Search
CPC ......... B60K 11/02; B60K 11/04; B60K 11/06; B60K 11/08; B60K 11/085; F01P 11/10
See application file for complete search history.

(56) References Cited

U.S. PATENT DOCUMENTS 4,971,172 A * 11/1990 Hoffman ................ B60K 13/02
180/68.3
5,205,484 A * 4/1993 Susa .................... B60H 1/3227
236/35.3
(Continued)

FOREIGN PATENT DOCUMENTS

JP 2001039171 A 2/2001
JP 2004124757 A 4/2004
(Continued)

OTHER PUBLICATIONS

U.S. Appl. No. 15/525,775, filed May 10, 2017, Maeda et al.

*Primary Examiner* — Katy M Ebner
(74) *Attorney, Agent, or Firm* — Harness, Dickey & Pierce, P.L.C.

(57) ABSTRACT

An air guiding unit has a shroud having a vent hole, an air guiding duct, and a valve housed in the air guiding duct. A radiator, an engine cooling heat exchanger, and a blower are fixed to the shroud. The shroud guides an air flowing into an engine room from an engine room opening and passing through the radiator and the engine cooling heat exchanger. The air guiding duct has a first opening, which is connected to the vent hole of the shroud, and a second opening, which is open in the engine room toward a rear space defined on a rear side of the engine. The air guiding duct therein has a duct interior channel through which the air flows between the first opening and the second opening. The valve is configured to increase and decrease an opening degree of the duct interior channel.

6 Claims, 9 Drawing Sheets

(51) Int. Cl.
  *F01P 5/02*   (2006.01)
  *F01P 11/10*  (2006.01)
  *F01P 1/06*       (2006.01)
  *F01P 3/18*       (2006.01)
  *F01P 5/04*       (2006.01)
  *F01P 1/00*       (2006.01)
  *F01P 5/06*       (2006.01)

(52) U.S. Cl.
  CPC . *F01P 1/06* (2013.01); *F01P 3/18* (2013.01); *F01P 5/06* (2013.01); *F01P 2001/005* (2013.01); *F01P 2005/046* (2013.01)

(56) References Cited

U.S. PATENT DOCUMENTS

| | | | | |
|---|---|---|---|---|
| 5,269,264 | A * | 12/1993 | Weinhold | B60K 11/085 123/198 E |
| 6,035,955 | A * | 3/2000 | Suzuki | B60K 11/08 180/68.1 |
| 6,302,228 | B1 * | 10/2001 | Cottereau | B60K 11/08 180/68.1 |
| 6,988,574 | B2 * | 1/2006 | Jones | B60K 11/08 180/68.1 |
| 7,290,630 | B2 * | 11/2007 | Maeda | B62D 25/084 180/68.2 |
| 8,752,660 | B2 * | 6/2014 | Ajisaka | B60K 11/04 180/291 |
| 9,776,499 | B2 * | 10/2017 | Nam | F02B 29/0443 |
| 10,179,509 | B2 * | 1/2019 | Maeda | B60K 11/06 |
| 10,344,663 | B2 * | 7/2019 | Nam | B60K 11/085 |
| 10,479,191 | B2 * | 11/2019 | Ivey | A01D 41/1252 |
| 10,556,494 | B2 * | 2/2020 | Nagaosa | H01M 8/04776 |
| 10,569,643 | B2 * | 2/2020 | Gilotte | B60T 5/00 |
| 2003/0183432 | A1 * | 10/2003 | Suzuki | F01P 3/18 180/68.1 |
| 2018/0264932 | A1 * | 9/2018 | Okugawa | B60K 11/04 |
| 2019/0264599 | A1 * | 8/2019 | Bandai | B60R 13/0884 |

FOREIGN PATENT DOCUMENTS

| | | |
|---|---|---|
| JP | 2007099194 A | 4/2007 |
| JP | 2007290625 A | 11/2007 |

* cited by examiner

AIR GUIDING UNIT AND COOLING MODULE

CROSS REFERENCE TO RELATED APPLICATIONS

This application is a U.S. National Phase Application under 35 U.S.C. 371 of International Application No. PCT/JP2016/070131 filed on Jul. 7, 2016 and published in Japanese as WO 2017/010396 A1 on Jan. 19, 2017. This application is based on and claims the benefit of priority from Japanese Patent Application No. 2015-138450 filed on Jul. 10, 2015. The entire disclosures of all of the above applications are incorporated herein by reference.

TECHNICAL FIELD

The present disclosure relates to an air guiding unit and cooling module mounted to an engine room of a vehicle.

BACKGROUND ART

Patent Literature 1 discloses an inter-cooler cooling duct that cools an inter cooler of a vehicle as an example of the air guiding unit that guides air. The inter-cooler cooling duct connects an air inlet of the inter cooler and an air outlet of a hood of the vehicle. The air outlet is defined in the hood of the vehicle on a side adjacent to the engine room.

Specifically, the inter-cooler cooling duct disclosed by Patent Literature 1 has an upper opening and a lower opening. The upper opening is connected to the air outlet of the hood. The lower opening is connected to the air inlet of the inter cooler when the hood is closed. The inter-cooler cooling duct guides an outside air, such that the outside air flows from the air outlet to the inter cooler after passing through the hood.

PRIOR ART LITERATURES

Patent Literature

Patent Literature 1: JP 2001-39171 A

SUMMARY OF INVENTION

The engine room of the vehicle has a cooler module, i.e., a cooling module, which is configured to operate a cooling performance. The cooling module has a radiator, a condenser, a blower, and a shroud. The radiator dissipates heat of an engine cooling water. The condenser serves as a radiator configured as part of an air conditioner that performs an air conditioning in a vehicle compartment. The blower blows a cooling air. The shroud combines the radiator, the condenser, and the blower and guides the cooling air. A traveling air and the cooling air dissipate heat of the engine cooling water and heat of a refrigerant circulating in the air conditioner.

The cooling module tends to be arranged in a front area inside the engine room by considering a layout of the vehicle. Exhaust heat from the cooling module, i.e., heat that is transferred to the outside air in the radiator and the condenser, transfers to the engine. According to this structure, the engine is arranged on a rear side of the cooling module inside the vehicle and moves the vehicle, whereby heat dissipation efficiency may deteriorate.

Recently, a size of the engine room is reducing, and the engine is configured to emit exhaust gas toward a rear side of the engine. Accordingly, heat concentrates in a rear space defined on the rear side of the engine inside the engine room easily. As a result, electronic components arranged near the rear space may be damaged by the heat.

Then, the inventors considered mounting a duct that guides an air, which flows into the engine room from a front side of the engine room, to the rear space of the engine. The duct guides the air to the rear space of the engine during a normal traveling state. However, there is a case where the blower is operated to draw air from the front side while the engine is in an idle state or the vehicle moves at a low speed. In this case, a pressure in a front portion of the duct becomes negative, whereby the blower draws air both from the front side and the rear space of the engine through the duct.

In this situation, a volume of the air which is drawn by the blower from the front side, i.e., a volume of a heat exchanger passing air which passes through the radiator and the condenser, becomes small as compared to that in a configuration in which the duct is omitted. It is considered to use the inter-cooler cooling duct disclosed by Patent Literature 1 as the above-described duct, however the above-described situation cannot be avoided by using the inter-cooler cooling duct. The above-described issues are the results of the inventors' dedicated studies.

The present disclosure addresses the above-described issues, thus it is an objective of the present disclosure to guide air, which flows into an engine room from a front side of the engine room, to a rear space of an engine and to suppress a flow of air which flows from the rear space to the front side through an air introduction duct inside the engine room.

To achieve the above-described objective, according to an example of the present disclosure, an air guiding unit is mounted to a vehicle having an engine housed in an engine room. The engine room has an engine room opening that is open toward a front side of the vehicle. An air flows into the engine room from the engine room opening. The air guiding unit has a shroud, an air guiding duct, and a valve. The shroud combines a radiator, an engine cooling heat exchanger, and a blower. The radiator is configured as part of an air conditioner. The engine cooling heat exchanger and the blower are configured to cool the engine. The shroud guides air flowing from the engine room opening and passing through the radiator and the engine cooling heat exchanger. The shroud has a vent hole. The air guiding duct has a first opening, a second opening, and a duct interior channel. The first opening is connected to the vent hole of the shroud to open through the vent hole. The second opening is open in the engine room toward a rear area defined on a rear side of the engine. The duct interior channel is defined between the first opening and the second opening. The air flows between the first opening and the second opening through the duct interior channel. The valve is mounted to the air guiding duct and is configured to increase and decrease an opening degree of the duct interior channel.

As described above, the first opening of the air guiding duct is connected to the shroud at the vent hole, and is open through the vent hole. The second opening of the air guiding duct is open in the engine room toward the rear space defined on the rear side of the engine. Accordingly, the air flowing into the engine room from the front side of the vehicle can be guided to the rear space which is defined in the engine room on the rear side of the engine. In addition, since the valve is mounted to the air guiding duct, the valve can suppress a flow of the air flowing from the rear space toward the front side of the vehicle through the air guiding duct.

DESCRIPTION OF EMBODIMENTS

Embodiments of the present disclosure will be described hereafter referring to drawings.

In the embodiments, a part that corresponds to or equivalents to a matter described in a preceding embodiment may be assigned with the same reference number.

First Embodiment

Figure 1:
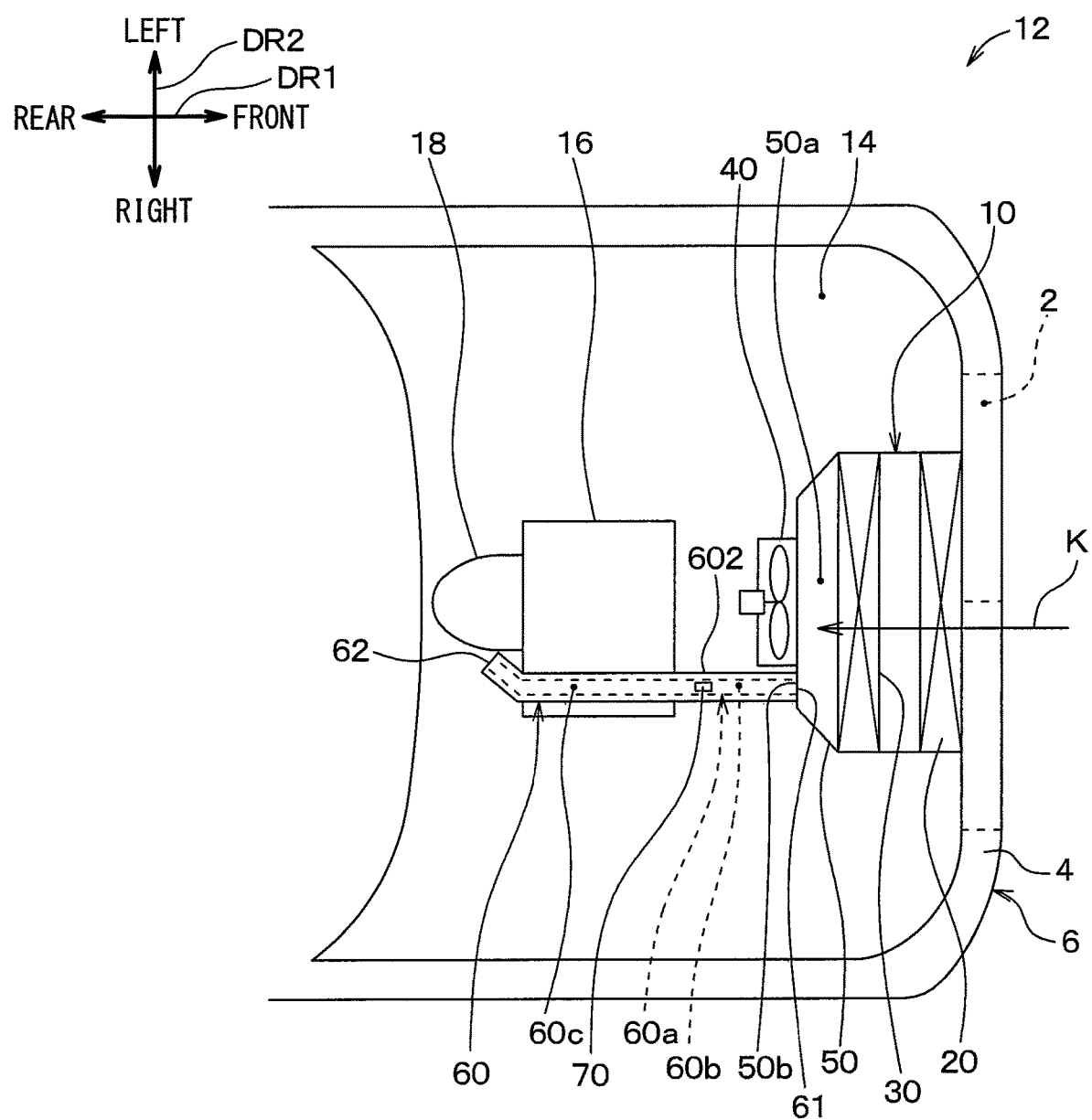
FIG. 1 is a schematic diagram illustrating a whole structure of a cooling module when viewed from an upper side of a vehicle relating to a first embodiment.

FIG. 1 is a schematic diagram illustrating a whole structure of a cooling module 10 when viewed from an upper side of a vehicle relating to the present embodiment. The double arrow DR1 and the double arrow DR2 shown in FIG. 1 and the double arrow DR3 shown in FIG. 2 and described later indicate directions relating to a vehicle 12 that mounts the cooling module 10. That is, the double arrow DR1 shown in FIG. 1 shows a front-rear direction DR1 of the vehicle, the double arrow DR2 shows a left-right direction DR2, i.e., a lateral direction DR2, of the vehicle, and the double arrow DR3 shows an up-down direction DR3 of the vehicle.

As shown in FIG. 1, the vehicle 12, e.g., a car 12, has an engine room 14 provided in a front area of the car 12. The cooling module 10 is housed in the engine room 14 to extend from a position between an engine room opening 2 and an engine 16 to a rear side of the engine 16 in the front-rear direction DR1.

The engine room 14 is a chamber that houses the engine 16. In other words, the engine room 14 is a front engine room that is located on a front side of a passenger compartment, i.e., a vehicle compartment, in the car 12. The engine room opening 2 is open in the engine room 14 toward the front side of the car 12. Air passes through the engine room opening 2 in the front-rear direction DR1. The engine room opening 2 is defined in a front grille 4 of the car 12. Since the front grille 4 has the engine room opening 2, a traveling air (i.e., an outside air) passes through the engine room opening 2 and flows into the engine room 14 from the engine room opening 2.

As shown in FIG. 1, the cooling module 10 has a condenser 20, a radiator 30, an electric fan 40, a shroud 50, an air guiding duct 60, and a switching valve 70 as a valve. The shroud 50, the air guiding duct 60, and the switching valve 70, as a whole, configure an air guiding unit that guides air in the cooling module 10.

The condenser 20, the radiator 30, the electric fan 40, and the shroud 50 are located between the engine room opening 2 and the engine 16 in the front-rear direction DR1 inside the cooling module 10. The condenser 20 configures an air conditioner that performs an air conditioning for the vehicle compartment. Specifically, the condenser 20 configures a refrigeration cycle device, which circulates a refrigerant in the air conditioner, together with a compressor, a pressure reducing valve, and an evaporator. The condenser 20 is a heat exchanger serving as a radiator that dissipates heat of a high-pressure refrigerant discharged from the compressor thereby condensing the high-pressure refrigerant.

The radiator 30 is located on a rear side of the condenser 20 and on a front side of the electric fan 40 in the front-rear direction DR1. The radiator 30 is an engine cooling heat exchanger that is configured to cool the engine 16. The radiator 30 dissipates heat of an engine cooling water, which is a heat medium circulating in the engine 16, to the outside air, thereby cooling the engine 16.

The radiator 30 is located on an upstream side of the electric fan 40 in a flow direction of air flowing in an introduction path 50a. The introduction path 50a is an air passage that guides the air, which is drawn from the engine room opening 2, to the electric fan 40 through the condenser 20 and the radiator 30 as shown by an arrow K in FIG. 1. The flow direction of the air flowing in the introduction path 50a is, in other words, a flow direction of a main flow that flows in the introduction path 50a with a largest volume as compared to other air flows flowing in the introduction path 50a.

The electric fan 40 is, for example, an axial blower. The electric fan 40 causes a flow of air (i.e., a cool air) that flows from the engine room opening 2 from the front side of the car 12 and passes through the condenser 20 and the radiator 30. In other words, the electric fan 40 draws the air after passing through the condenser 20 and the radiator 30 from a front side and blows the air toward a rear side in the front-rear direction DR1. The electric fan 40 is configured to be switched between being ON and being OFF. That is, the electric fan 40 is operated to draw the air from the front side when being ON and is stopped when being OFF.

The shroud 50 is fixed to a vehicle body 6. The condenser 20, the radiator 30, and the electric fan 40 are fixed to the shroud 50. The condenser 20, the radiator 30, and the electric fan 40 are fixed to the shroud 50 directly or indirectly. According to an example of the present embodiment, the condenser 20, the radiator 30, and the electric fan 40 are fixed to the shroud 50 directly. Specifically, the condenser 20 is fixed to the radiator 30 directly thereby being fixed to the shroud 50 through the radiator 30.

The shroud 50 serves as a housing that defines the introduction path 50a therein. The introduction path 50a guides the air, which is drawn from the engine room opening 2, to the electric fan 40 through the condenser 20 and the radiator 30. In other words, the shroud 50 serves as an air guiding member that guides the air, which is drawn from the engine room opening 2, to the electric fan 40 through the condenser 20 and the radiator 30. The shroud 50 has a tubular shape and surrounds a space defined between the condenser 20 and the radiator 30 and a space defined between the radiator 30 and the electric fan 40.

The shroud 50 has a vent hole 50b. A part of the air flowing in the introduction path 50a flows into the air guiding duct 60 from the vent hole 50b. The vent hole 50b is located on a downstream side of the radiator 30 and an upstream side of the electric fan 40 in the flow direction of the air flowing in the introduction path 50a. That is, the vent hole 50b of the shroud 50 is located on a rear side of the radiator 30 and on a front side of the electric fan 40 in the front-rear direction DR1. The vent hole 50b is located on a left side or a right side of the electric fan 40 in the lateral direction DR2.

The air guiding duct 60 is a tube that is positioned on an upper side of the engine 16 inside the engine room 14. The air guiding duct 60 defines a duct interior channel 60a, which serves as an air passage 60a in which air flows, therein.

The air guiding duct 60 has a front opening 61 as a first opening and a rear opening 62 as a second opening. The air flows between the front opening 61 and the rear opening 62 through the duct interior channel 60a of the air guiding duct 60.

Figure 2:
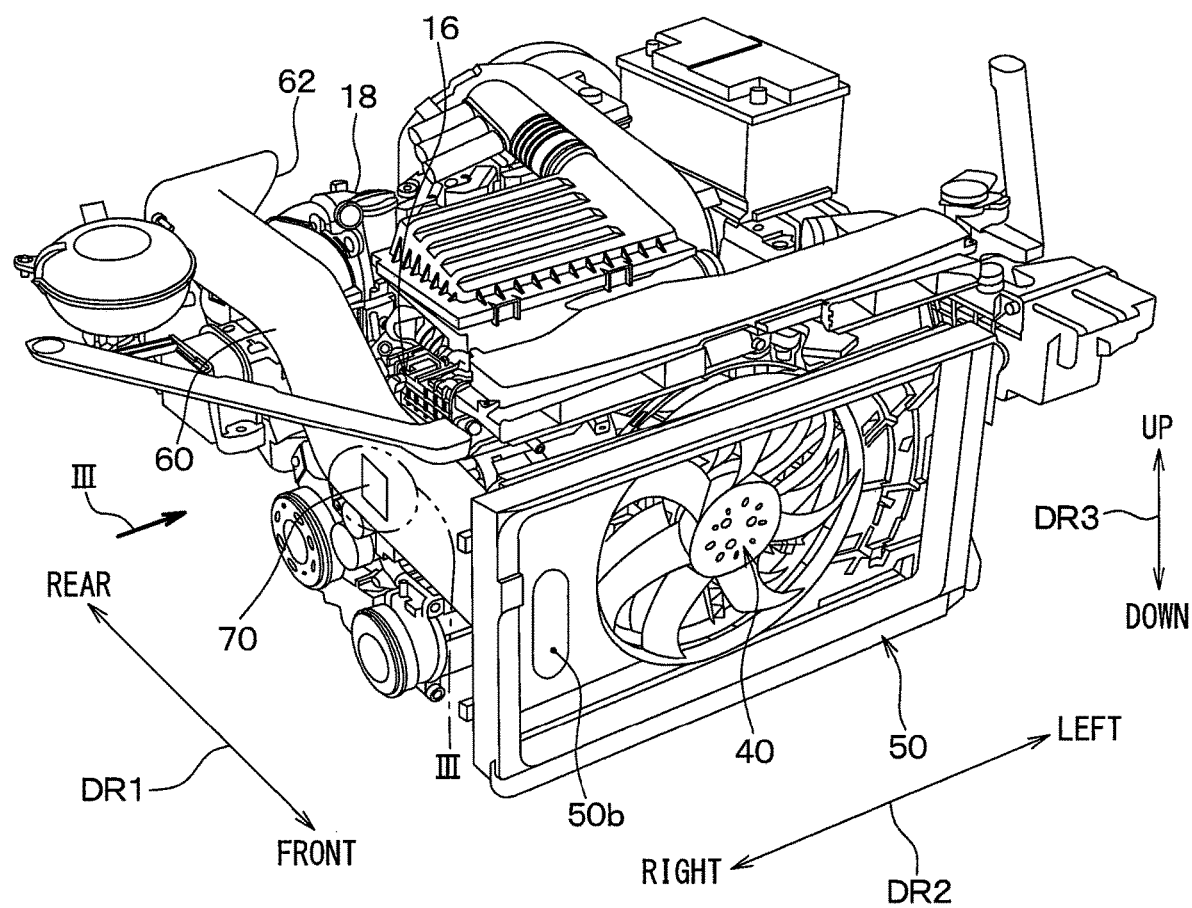
FIG. 2 is a perspective view illustrating an air guiding duct illustrated in FIG. 1, a shroud, an electric fan, and an engine that moves the vehicle.

As shown in FIG. 1 and FIG. 2, the front opening 61 is formed on a front end of the air guiding duct 60. The front opening 61 is connected to the vent hole 50b of the shroud 50 and is open to the introduction path 50a through the vent hole 50b. The front opening 61 is open toward the radiator 30, i.e., is open frontward. Thus, the front opening 61 configures a duct inlet of the air guiding duct 60 on a side adjacent to the shroud 50. FIG. 2 is a perspective view illustrating the air guiding duct 60 illustrated in FIG. 1, the shroud 50, the electric fan 40, and the engine 16.

The rear opening 62 of the air guiding duct 60 is formed on a rear end of the air guiding duct 60. The rear opening 62 is open in the engine room 14 toward a rear space defined on the rear side of the engine 16. That is, the rear opening 62 is open in the engine room 14 toward an exhaust manifold 18 of the engine 16. Thus, the rear opening 62 configures a duct outlet of the air guiding duct 60 on a side opposite to the shroud 50. A direction in which the rear opening 62 is open is not limited to a rear direction of the front-rear direction DR1 as long as being open on the rear side of the engine 16.

The air guiding duct 60 guides the air from the front opening 61 to the rear opening 62.

Figure 3:
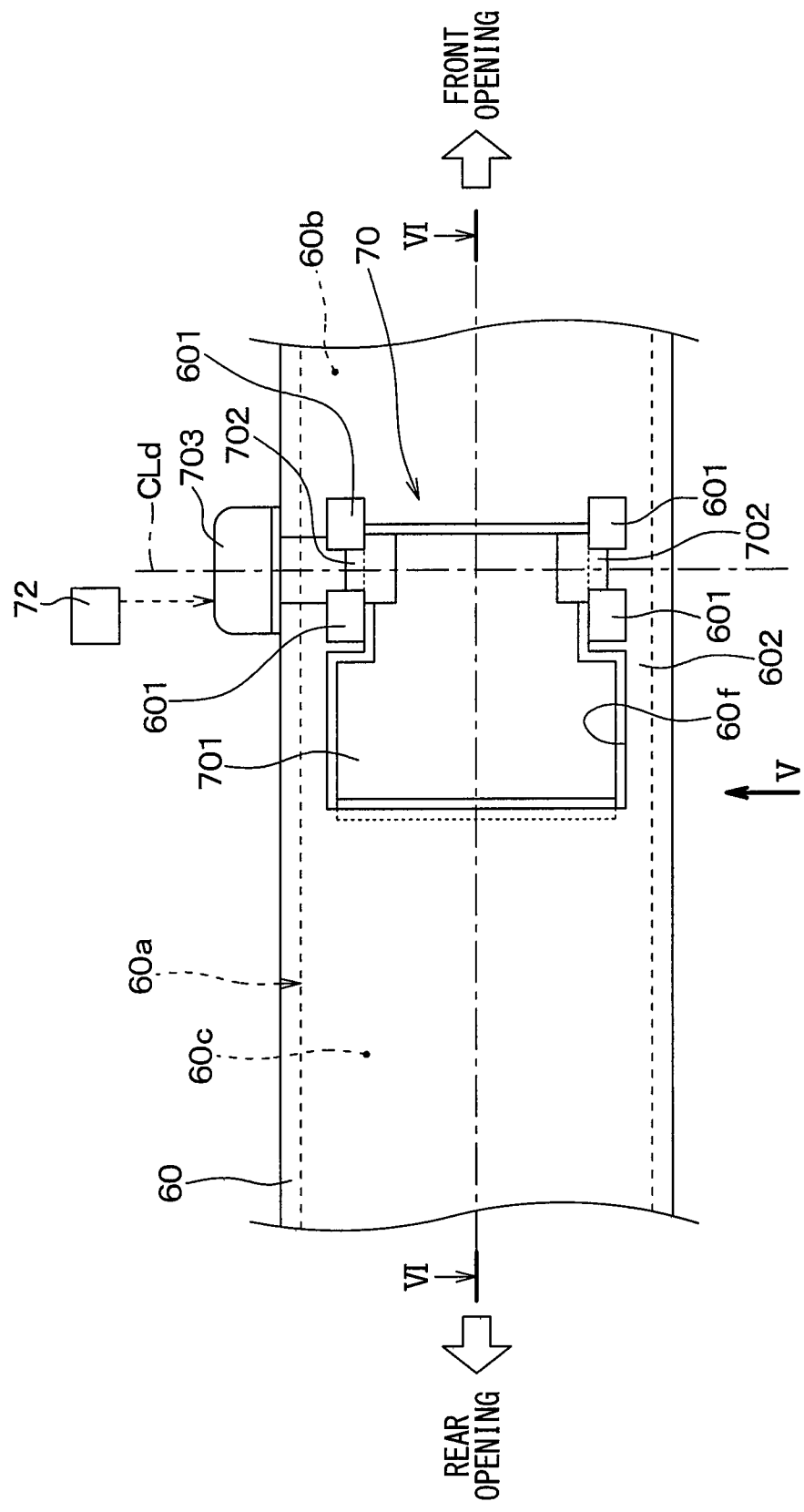
FIG. 3 is an enlarged planer diagram illustrating a portion III shown in FIG. 2 relating to the first embodiment.

FIG. 3 is an enlarged diagram illustrating a portion III shown in FIG. 2 and is a planer diagram illustrating the switching valve 70. As shown in FIG. 3, the switching valve 70 is located between the front opening 61 and the rear opening 62 in the air guiding duct 60 (refer to FIG. 1). The switching valve 70 serves as a door mechanism that opens and closes the duct interior channel 60a of the air guiding duct 60. In other words, the switching valve 70 increases and decreases an opening degree of the duct interior channel 60a. The opening degree of the duct interior channel 60a is, i.e., a degree of opening of the duct interior channel 60a. The switching valve 70 increases and decreases the opening degree thereby increasing and decreasing a passage sectional area of the duct interior channel 60a.

Figure 4:
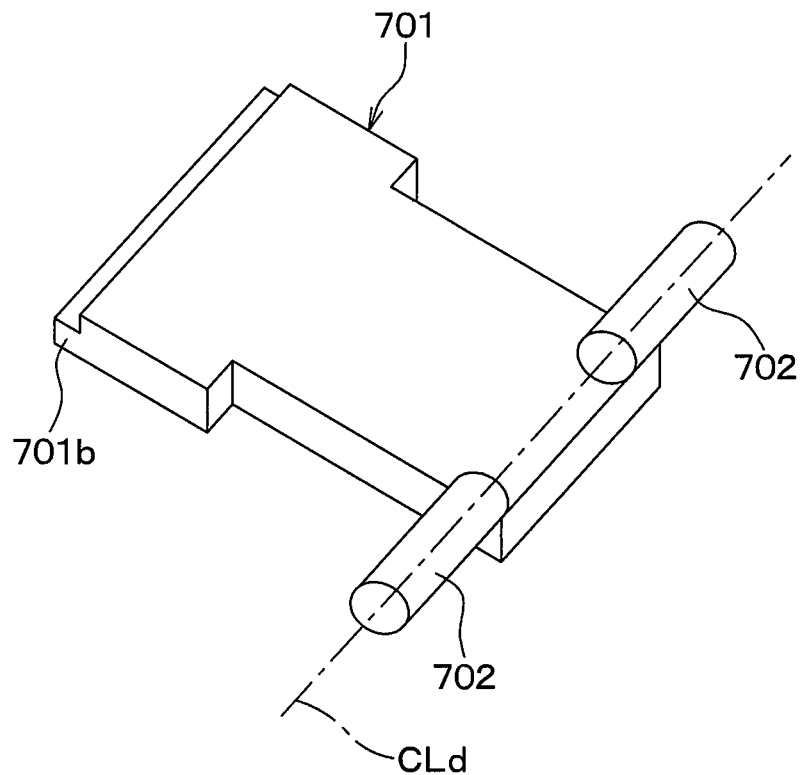
FIG. 4 is a perspective view illustrating a rotary door and a door shaft of the rotary door relating to the first embodiment.

The switching valve 70 has a rotary door 701, a door shaft 702, and an actuator 703. As shown in FIG. 4, the rotary door 701 is a cantilever door having a plate shape. FIG. 4 is a perspective view illustrating the rotary door 701 and the door shaft 702. For example, the rotary door 701 and the door shaft 702 are made of resin and combined to each other. That is, the rotary door 701 and the door shaft 702 are formed separately from the air guiding duct 60.

The door shaft 702 has a columnar shape. The rotary door 701 rotates about the door shaft 702. In other words, the door shaft 702 has a center axis serving as a rotational axis CLd, and the rotary door 701 rotates about the rotational axis CLd.

Figure 5:
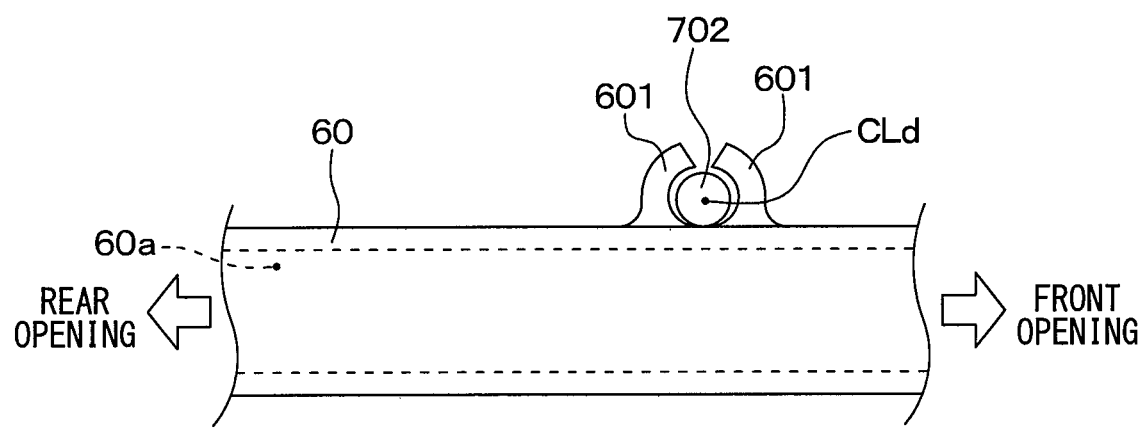
FIG. 5 is a diagram illustrating the air guiding duct and a switching valve when viewed in a direction V shown in FIG. 3 relating to the first embodiment.

As shown in FIG. 3 and FIG. 5, the air guiding duct 60 has two joints 601 that are located on one side and an other side of the rotary door 701 in an axial direction in which the rotational axis CLd extends respectively. That is, the air guiding duct 60 has a pair of joints 601. FIG. 5 is a diagram illustrating the air guiding duct 60 and the switching valve 70 in a direction shown by an arrow V in FIG. 3.

The pair of joints 601 is connected to the rotary door 701 through the door shaft 702 and supports the rotary door 701 to rotate about the rotational axis CLd. Specifically, two ends of the door shaft 702 are inserted into the two joints 601 respectively, whereby the pair of joints 601 supports the rotary door 701 to be rotatable.

Figure 6:
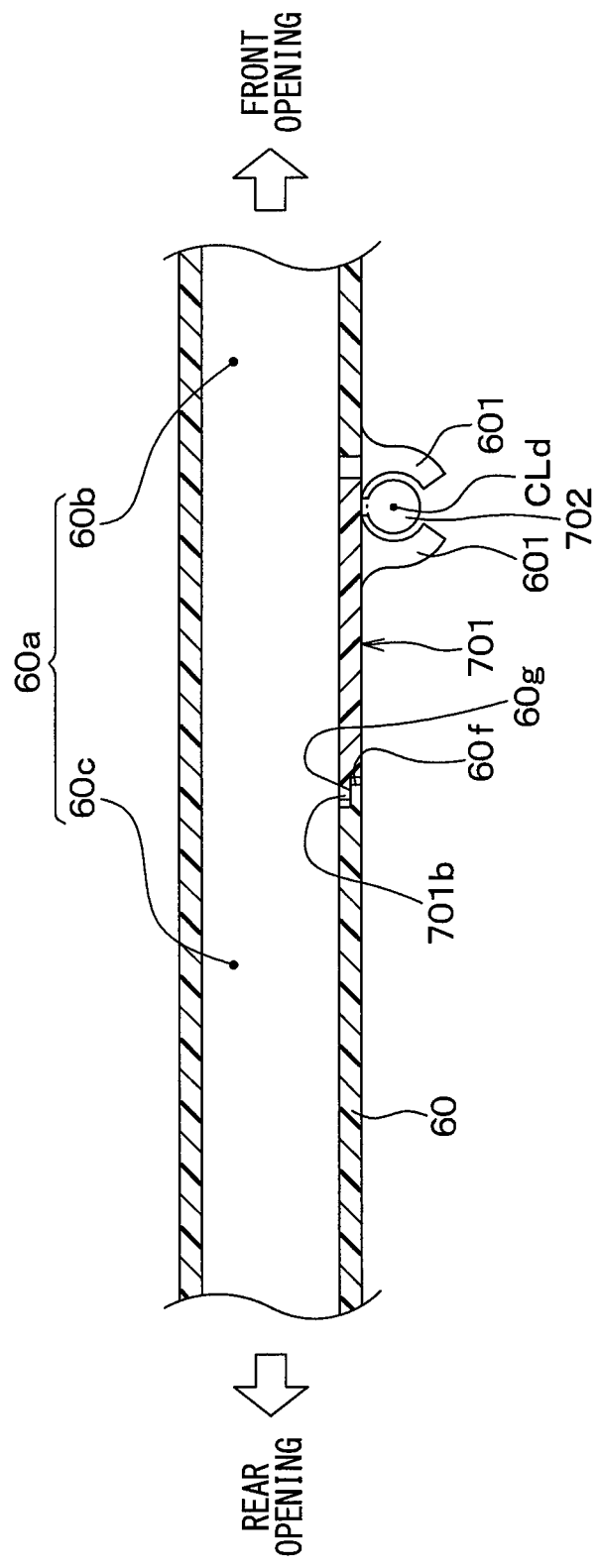
FIG. 6 is a cross-sectional view taken along a line VI-VI shown in FIG. 3.

As shown in FIG. 3 and FIG. 6, the air guiding duct 60 has an opening hole 60f that is located between the front opening 61 and the rear opening 62 (refer to FIG. 1). FIG. 6 is a cross-sectional view taken along a line VI-VI shown in FIG. 3.

The opening hole 60f is a through hole through which the duct interior channel 60a and an outside of the air guiding duct 60 communicate with each other. The rotational axis CLd is located between the opening hole 60f and the front opening 61 in a longitudinal direction of the air guiding duct 60, i.e., a longitudinal direction of the duct interior channel 60a. The rotational axis CLd extends in a direction intersecting with the longitudinal direction. For example, the rotational axis CLd is perpendicular to the longitudinal direction.

A direction in which the opening hole 60f of the air guiding duct 60 is not limited as long as the opening hole 60f is open to the outside of the air guiding duct 60. For example, the direction in which the opening hole 60f is open may be set to a direction in which air can easily flow through the opening hole 60f without being interrupted by an object when the opening hole 60f is open.

Positions of the opening hole 60f of the air guiding duct 60 and the switching valve 70 between the front opening 61 and the rear opening 62 may be set to positions where the air flows through the opening hole 60f easily when the opening hole 60f is opened. For example, the opening hole 60f and the switching valve 70 may be located between the front opening 61 and the rear opening 62 as close to the from opening 61 as possible.

The air guiding duct 60 has a hole forming portion 602 where the opening hole 60f is defined. The duct interior channel 60a has a front portion 60b as a first-opening-side portion and a rear portion 60c as a second-opening-side portion. The hole forming portion 602 is located between the front portion 60b and the rear portion 60c. That is, the front portion 60b is defined between the front opening 61 and the hole forming portion 602, and the rear portion 60c is defined between the hole forming portion 602 and the rear opening 62.

The switching valve 70 opens and closes the front portion 60b and the opening hole 60f with respect to the rear portion 60c. Specifically, the opening degree of the duct interior channel 60a decreases as the rotary door 701 rotates toward a position where the rotary door 701 shuts off a communication between the front portion 60b and the rear portion 60c. That is, the switching valve 70 increases an opening degree of the opening hole 60f with respect to the rear portion 60c as decreasing the opening degree of the duct interior channel 60a.

The rotary door 701 fits into the opening hole 60f when maximizing the opening degree of the duct interior channel 60a in a range of motion of the rotary door 701. The rotary door 701 closes the opening hole 60f upon being fitted into the opening hole 60f. More specifically, the rotary door 701 rotates in the air guiding duct 60 and closes the opening hole 60f inside the air guiding duct 60.

Thus, the rotary door 701 defines a part of the duct interior channel 60a in the opening hole 60f of the air guiding duct 60 when the rotary door 701 is located at a position where the rotary door 701 maximizes the opening degree of the duct interior channel 60a. That is, the switching valve 70 provides a door mechanism in which the rotary door 701 rotates from a position where the rotary door 701 serves as a part of the air guiding duct 60 toward an inside of the air guiding duct 60. Here, a condition that the rotary door 701 closes the opening hole 60f is not limited to a condition that the rotary door 701 completely closes the opening hole 60f, and includes a condition that the rotary door 701 minimizes the opening degree of the opening hole 60f in the range of motion of the rotary door 701. This is the same also about opening and closing of the front portion 60b.

The opening hole 60f of the air guiding duct 60 is formed slightly larger than the rotary door 701, such that the rotary door 701 is prevented from coming out of the opening hole 60f.

Figure 7:
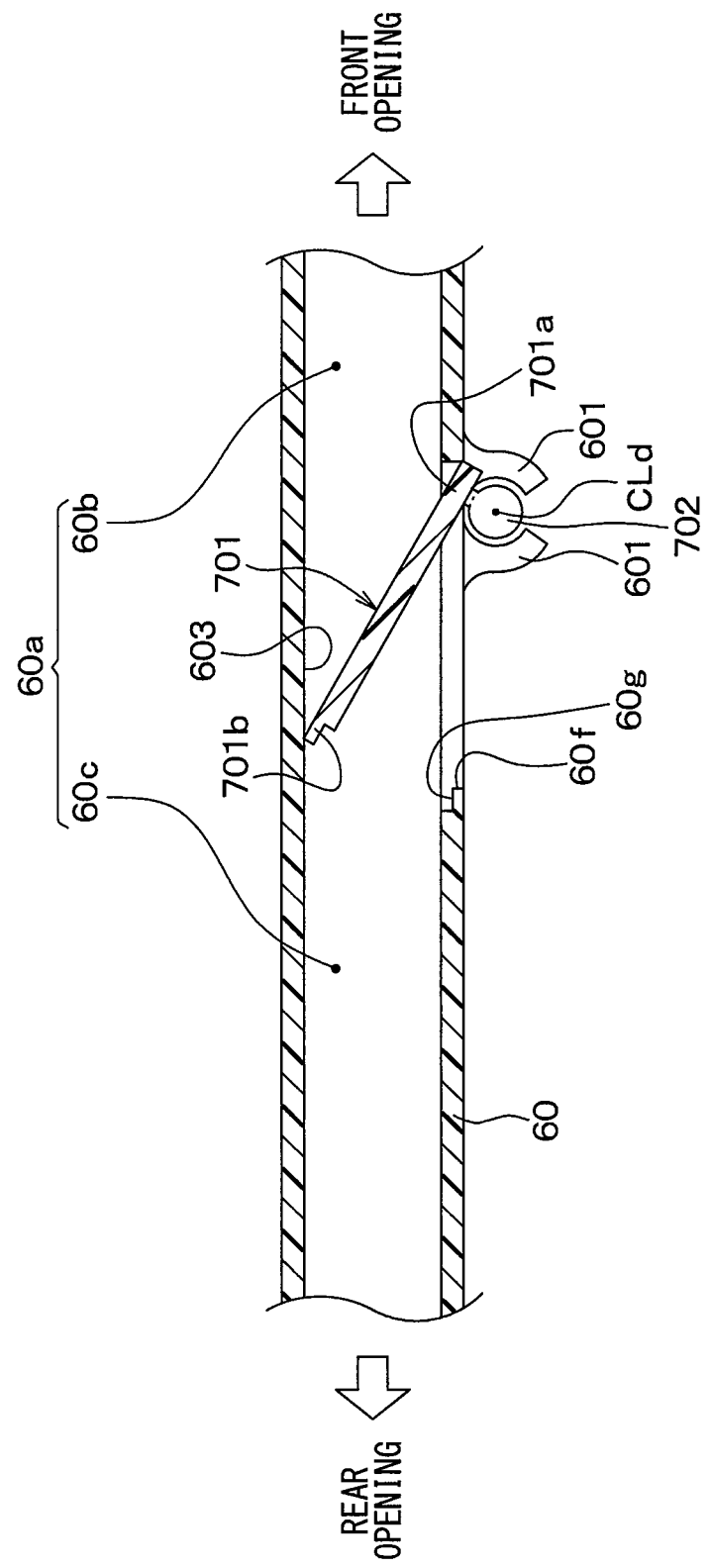
FIG. 7 is a cross-sectional view corresponding to the cross-sectional view of FIG. 6 (refer to FIG. 3) and showing a condition where the rotary door minimizes an opening degree of a duct interior channel.

As described above, the rotary door 701 rotates in the air guiding duct 60. FIG. 7 shows a condition where the rotary door 701 minimizes the opening degree of the duct interior channel 60a in the range of motion of the rotary door 701. In other words, FIG. 7 is a cross-sectional view corresponding to the cross-sectional view of FIG. 6 (refer to FIG. 3) and showing the condition where the rotary door 701 minimizes the opening degree of the duct interior channel 60a.

As shown in FIG. 7, the rotary door 701 has a shaft connection portion 701a and a wall connection portion 701b. The shaft connection portion 701a is attached to the door shaft 702. The wall connection portion 701b configures an end portion of the rotary door 701 facing the shaft connection portion 701a. Here, the air guiding duct 60 has an inner wall 603 defining the duct interior channel 60a. The wall connection portion 701b of the rotary door 701 comes in contact with the inner wall 603 when the rotary door 701 minimizes the opening degree of the duct interior channel 60a in the range of motion of the rotary door 701. For example, the wall connection portion 701b is made of a material such as rubber having elasticity. The wall connection portion 701b may be combined with a portion of the rotary door 701 excluding the wall connection portion 701b by a method such as a two-color molding. The wall connection portion 701b has elasticity, thereby being pressed against the inner wall 603 tightly when the opening degree of the duct interior channel 60a is minimized.

The air guiding duct 60 has a door fitting portion 60g. The wall connection portion 701b of the rotary door 701 is fitted to the door fitting portion 60g inside the air guiding duct 60 when the opening degree of the duct interior channel 60a is maximized, i.e., when the opening hole 60f is closed. At this time, the wall connection portion 701b is pressed against the door fitting portion 60g of the air guiding duct 60 tightly due to the elasticity of the wall connection portion 701b. The door fitting portion 60g of the air guiding duct 60 is a part of a rim defining the opening hole 60f.

Thus, the opening degree of the opening hole 60f is minimized when the rotary door 701 maximizes the opening degree of the duct interior channel 60a. On the other hand, the opening degree of the opening hole 60f is maximized when the rotary door 701 minimizes the opening degree of the duct interior channel 60a.

The actuator 703 of the switching valve 70 is, for example, an electric motor such as a stepping motor. As shown in FIG. 3, a rotary shaft of the actuator 703 is attached to the door shaft 702, whereby the actuator 703 is configured to set positions of the rotary door 701 consecutively.

An operation of the actuator 703 is controlled by a controller 72. Specifically, the controller 72 operates the actuator 703 such that the rotary door 701 minimizes the opening degree of the duct interior channel 60a in the range of motion of the rotary door 701 when a traveling speed of the car 12 is a specified speed or lower and the electric fan 40 is operated and draws the air from the front side of the car 12. That is, as shown in FIG. 7, the controller 72 operates the actuator 703 such that the rotary door 701 shuts of the communication between the front portion 60b and the rear portion 60c and opens the opening hole 60f when a traveling speed of the car 12 is a specified speed or lower and the electric fan 40 is operated and draws the air from the front side of the car 12.

On the other hand, the controller 72 operates the actuator 703 such that the rotary door 701 maximizes the opening degree of the duct interior channel 60a in the range of motion of the rotary door 701 when a condition for closing the front portion 60b and opening the opening hole 60f is not met. Specifically, the controller 72 operates the actuator 703 such that the rotary door 701 maximizes the opening degree of the duct interior channel 60a in the range of motion of the rotary door 701 when the traveling speed of the car 12 is higher than the specified speed or when the electric fan 40 is not drawing the air, e.g., when the electric fan 40 is stopped. That is, as shown in FIG. 6, the controller 72 operates the actuator 703 such that the rotary door 701 opens the communication between the front portion 60b and the rear portion 60c and closes the opening hole 60f when the traveling speed of the car 12 is higher than the specified speed or when the electric fan 40 is not drawing the air, e.g., when the electric fan 40 is stopped. The specified speed is experimentally set such that a low speed at which an air pressure in the introduction path 50a becomes negative while the electric fan 40 is operated can be detected. A condition where the traveling speed is the specified speed or lower includes a condition where the traveling speed is lower than a speed which is lower than the specified speed and a condition where the traveling speed is zero.

Referring to FIG. 1 and FIG. 2, the exhaust manifold 18 is a manifold that is mounted to an exhaust pipe, which emits exhaust gas emitted from the engine 16, and combines more than one exhaust passages connected to the engine 16. The exhaust manifold 18 is housed in the engine room 14 and located on the rear side of the engine 16.

According to the present embodiment, a turbine for a turbocharger and a catalytic device is arranged on the rear side of the engine 16 inside the engine room 14 in addition to the exhaust manifold 18. The catalytic device purifies toxic components included in the exhaust gas emitted from the engine 16 by oxidation and reduction. The turbocharger converts an internal energy of the exhaust gas into a rotational energy using the turbine and operates a compressor by using the rotational energy, thereby generating a compressed air and supplying the compressed air to a suction port of the engine 16. In other words, the turbine converts the internal energy of the exhaust gas into the rotational energy.

An air flow, i.e., the traveling air, is caused while the car 12 travels at a high speed. The air flow flows into the engine room 14 from the engine room opening 2 and passes through the condenser 20, the radiator 30, and the electric fan 40.

A part of the air flow, i.e., the traveling air, flows into the duct interior channel 60a of the air guiding duct 60 from the vent hole 50b of the shroud 50 through the front opening 61 after passing through the engine room opening 2, the condenser 20, and the radiator 30. The part of the traveling air flowing into the duct interior channel 60a flows from the rear opening 62 of the air guiding duct 60 toward the exhaust manifold 18. As a result, the part of the traveling air flowing out of the rear opening 62 of the air guiding duct 60 can cool the exhaust manifold 18, the catalytic device, and the turbine for the turbocharger that are located in the rear space defined on the rear side of the engine 16 inside the engine room 14. Therefore, the exhaust manifold 18, the catalytic device, the turbine, and components arranged in the rear space can be prevented from being damaged due to heat. The rear space is a space defined on the rear side of the engine 16 inside the engine room 14.

The air after cooling the exhaust manifold 18, the catalytic device, and the turbine flows to a lower side of the exhaust manifold 18. That is, the air, after passing through the engine room opening 2, the condenser 20, the radiator 30, the air guiding duct 60, and a periphery of the exhaust manifold 18, flows to a lower side a floor of the car 12.

The rest of the air, other than the air flowing into the air guiding duct 60, flowing into the introduction path 50a from the front side of the car 12 through the engine room opening 2 is drawn into the electric fan 40. The air flows to the lower side of the floor after drawn into the electric fan 40 and flowing along the engine 16. As a result, the engine 16 can be cooled by the air flowing from the introduction path 50a to the engine 16 through the electric fan 40.

As described above, the front opening 61 of the air guiding duct 60 is connected to the vent hole 50b of the shroud 50 and is open through the vent hole 50b. The rear opening 62 of the air guiding duct 60 is open toward the rear side of the engine 16 inside the engine room 14. Accordingly, the air flowing into the engine room from the front side of the car 12 can be guided to the rear space which is defined on the rear side of the engine 16 inside the engine room 14. In addition, the air guiding duct 60 mounts the switching valve 70, whereby the switching valve 70 can suppress the flow of air flowing backward from the rear space toward the front side of the car 12 through the air guiding duct 60 inside the engine room 14.

According to the present embodiment, the switching valve 70 is located between the front opening 61 and the rear opening 62 in the air guiding duct 60 and is configured to increase and decrease the opening degree of the duct interior channel 60a. Thus, the switching valve 70 can be mounted to the air guiding duct 60 even when a space in the engine room 14 where the switching valve 70 is arranged on a front side and a rear side of the air guiding duct 60.

According to the present embodiment, the controller 72 controls the actuator 703 such that the rotary door 701 minimizes the opening degree of the duct interior channel 60a in the range of motion of the rotary door 701 when the traveling speed of the car 12 is the specified speed or lower and the electric fan 40 is operated and draws air. Thus, a volume of air, which is drawn into the electric fan 40 from the rear space through the air guiding duct 60, can be reduced when the air pressure in the introduction path 50a becomes negative due to an operation of the electric fan 40. As a result, a volume of air passing through the condenser 20 and the radiator 30 can be secured in a configuration having the air guiding duct 60 to be substantially the same as a volume of air passing through the condenser 20 and the radiator 30 in a configuration having no air guiding duct 60, even when the air pressure in the introduction path 50a becomes negative.

According to the present embodiment, the opening hole 60f of the air guiding duct 60 is a hole through which the duct interior channel 60a and the outside of the air guiding duct 60 communicate with each other. The switching valve 70 increases the opening degree of the opening hole 60f with respect to the rear opening 60c as decreasing the opening degree of the duct interior channel 60a. Therefore, the traveling air flowing from the front side of the car 12 into the engine room 14 can flow to the rear portion 60c through the opening hole 60f, thereby flowing to the rear space even when the switching valve 70 closes the duct interior channel 60a.

According to the present embodiment, the rotary door 701 of the switching valve 70 rotates in the air guiding duct 60 and is configured to close the opening hole 60f inside the air guiding duct 60. The rotary door 701 rotates about the rotational axis CLd. The rotational axis CLd is located between the opening hole 60f and the front opening 61 and extends in the direction intersecting with the duct interior channel 60a. Therefore, the communication between the front portion 60b and the rear portion 60c can be switched between being open and being shut out, and a communication between the opening hole 60f and the rear portion 60c can be switched between being open and being shut out, by the single rotary door 701.

According to the present embodiment, the wall connection portion 701b of the rotary door 701 is in contact with the inner wall 603 of the air guiding duct 60 when the rotary door 701 minimizes the opening degree of the duct interior channel 60a in the range of motion of the rotary door 701 as shown in FIG. 7. The wall connection portion 701b has elasticity. Therefore, the wall connection portion 701b can be in contact with the inner wall 603 tightly, whereby a sealing performance, i.e., a shuttering performance, when the rotary door 701 closes the front portion 60b can be improved.

According to the present embodiment, the switching valve 70 is located between the front opening 61 and the rear opening 62 in the air guiding duct 60, such that the rotary door 701 of the switching valve 70 is operated inside the air guiding duct 60. Accordingly, a space in which the switching valve 70 is operated can be included in a space occupied by the air guiding duct 60. As a result, a total space occupied by the switching valve 70 and the air guiding duct 60 as a whole can be small as compared to a configuration in which the switching valve 70 is attached to an end portion of the air guiding duct 60.

Second Embodiment

A second embodiment will be described hereafter. In the present embodiment, features that are different from the first embodiment will be described mainly. A description of a part that corresponds to or equivalents to a matter described in a preceding embodiment may be omitted or simplified. This is the same in a third embodiment described later.

Figure 8:
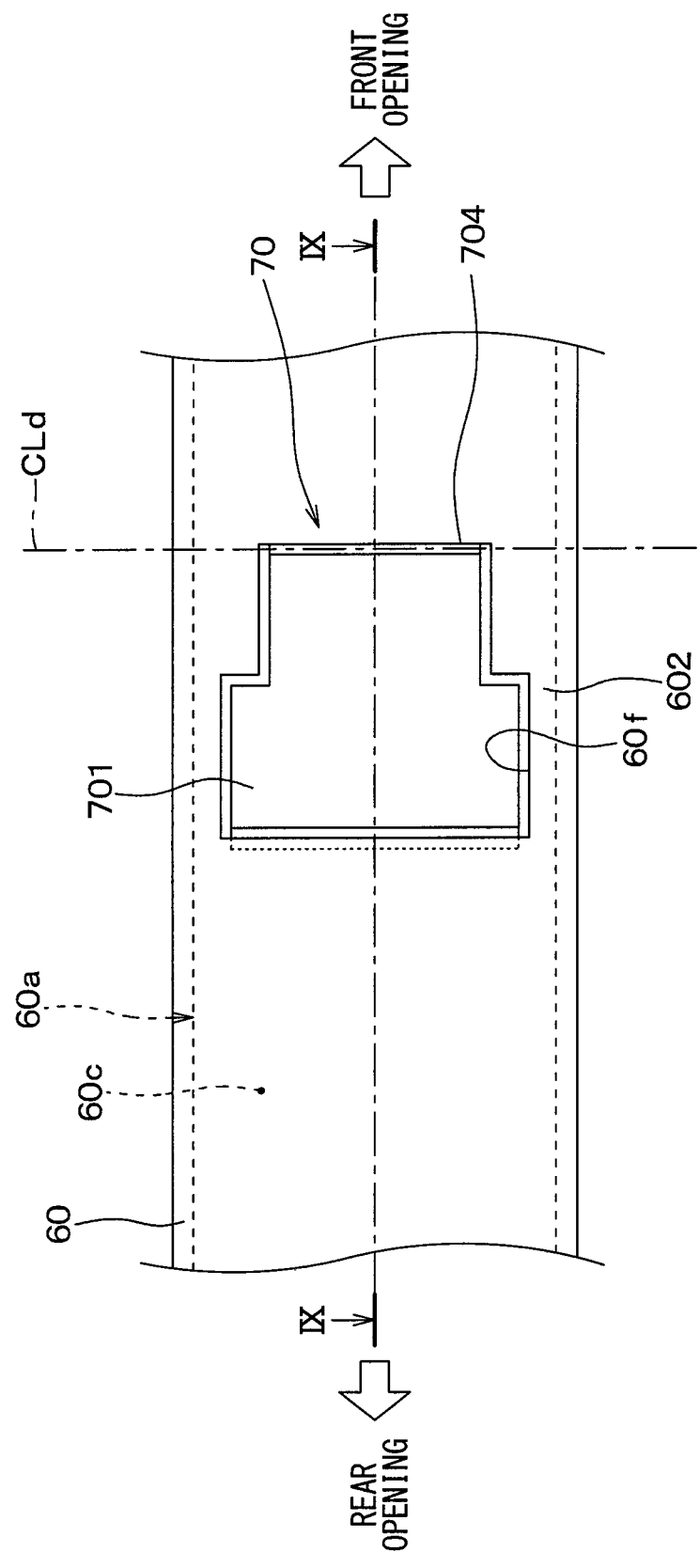
FIG. 8 is a planar diagram illustrating a switching valve relating to a second embodiment and corresponds to the planer diagram shown in FIG. 3 relating to the first embodiment.
Figure 9:
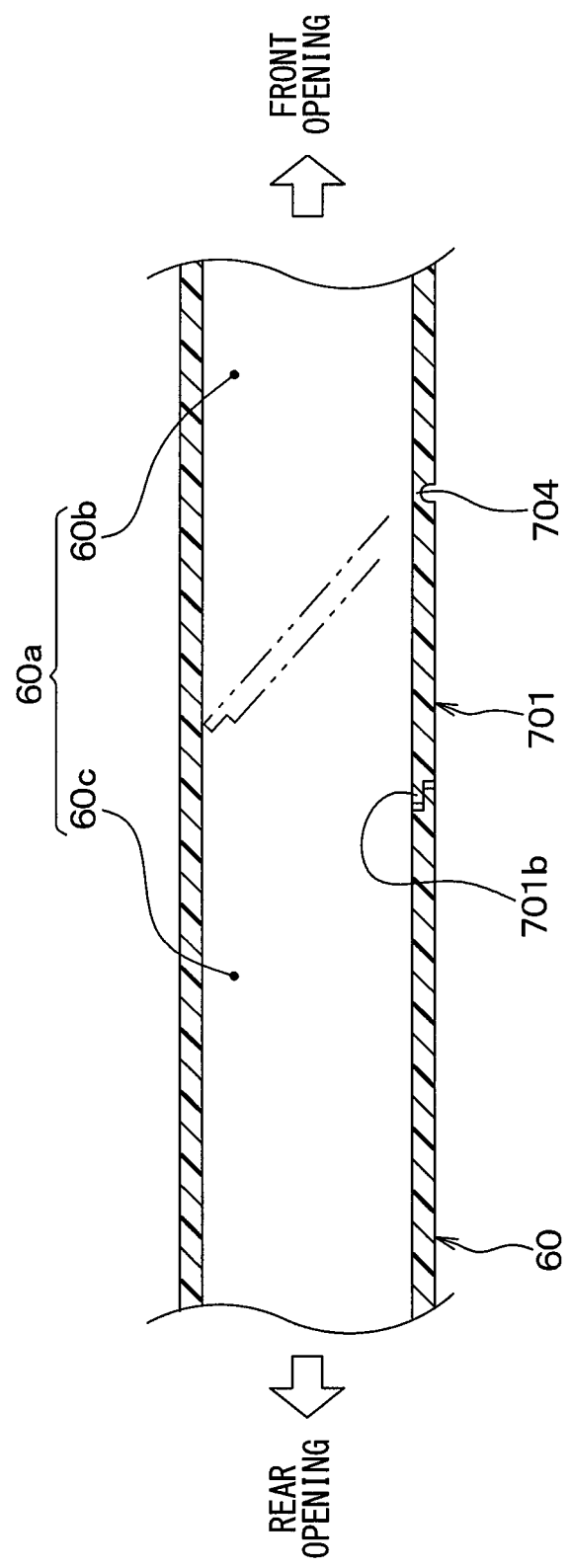
FIG. 9 is a cross-sectional view taken along a line IX-IX shown in FIG. 8.

FIG. 8 is a planar diagram illustrating the switching valve 70 relating to the present embodiment and corresponds to the planer diagram shown in FIG. 3 relating to the first embodiment. FIG. 9 is a cross-sectional view taken along a line IX-IX shown in FIG. 8. As shown in FIG. 8 and FIG. 9, the rotary door 701 of the present embodiment is combined with the air guiding duct 60. This aspect is the difference from the first embodiment. In FIG. 8 and FIG. 9, an illustration of the actuator 703 is omitted.

Specifically, the switching valve 70 does not have the door shaft 702 shown in FIG. 3, and has the rotary door 701 provided with a flexible portion 704 instead. The flexible portion 704 has flexibility. The flexible portion 704 configures a part of a periphery of the rotary door 701 and is attached to the air guiding duct 60. For example, the flexible portion 704 can be curved easily by having flexibility.

The rotary door 701 is combined with the air guiding duct 60 through the flexible portion 704. Accordingly, the rotary door 701 rotates about the rotational axis CLd similarly to the rotary door 701 of the first embodiment due to a deformation of the flexible portion 704. That is, the flexible portion 704 of the rotary door 701 serves as a joint where the rotary door 701 is bent. In FIG. 9, the rotary door 701 positioned to maximize the opening degree of the duct interior channel 60a in the range of motion of the rotary door 701 is illustrated with a solid line, and the rotary door 701 positioned to minimize the opening degree of the duct interior channel 60a is illustrated with a two-dot chain line.

For example, the flexible portion 704 has flexibility in a manner that a thickness of the flexible portion 704 is set small or that the flexible portion 704 is made of a soft material. The flexible portion 704 may be made of a material that is different from a material which forms a portion of the rotary door 701 excluding the flexible portion 704. In this case, the rotary door 701 and the air guiding duct 60 may be formed by two-color molding.

The present embodiment can provide the same effects that are provided by the common configuration as the first embodiment. According to the present embodiment, the rotary door 701 is combined with the air guiding duct 60 through the flexible portion 704. Therefore, a manufacturing method can be simplified for assembling the rotary door 701 to the air guiding duct 60 as compared to a configuration in which the rotary door 701 is formed separately from the air guiding duct 60.

Third Embodiment

A third embodiment will be described hereafter. In the present embodiment, features that are different from the first embodiment will be described mainly.

Figure 10:
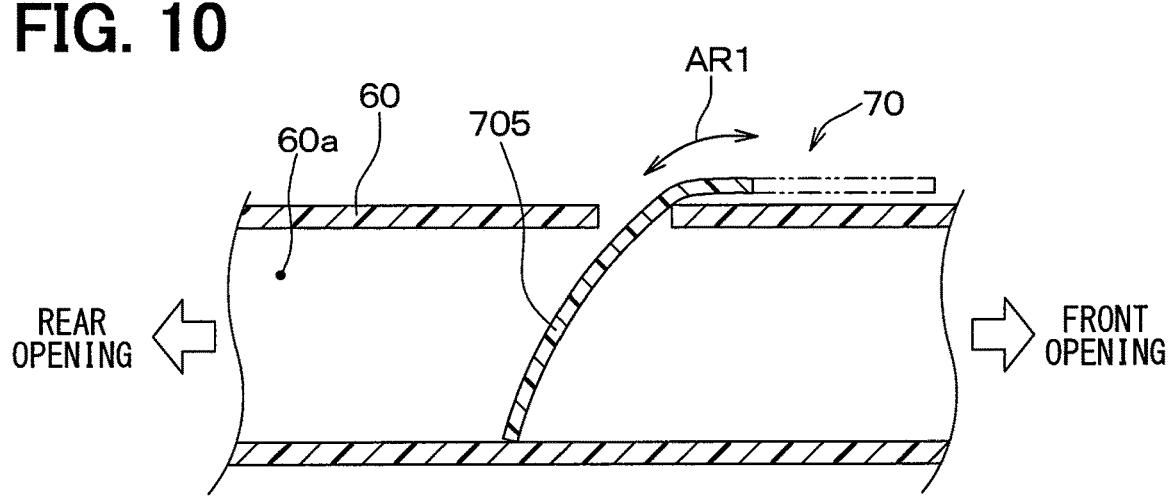
FIG. 10 is a cross-sectional view taken along a line corresponding to the line VI-VI shown in FIG. 3 and illustrating an air guiding duct and a switching valve relating to a third embodiment, FIG. 10 corresponding to FIG. 7 relating to the first embodiment.

FIG. 10 is a cross-sectional view taken along a line corresponding to the line VI-VI shown in FIG. 3 and illustrating the air guiding duct 60 and the switching valve 70 relating to the third embodiment, FIG. 10 corresponding to FIG. 7 relating to the first embodiment. As shown in FIG. 10, the air guiding duct 60 is not provided with the opening hole 60f illustrated in FIG. 7, and the switching valve 70 has a film door 705 instead of the rotary door 701 and the door shaft 702. These aspects are the differences from the first embodiment. An illustration of the actuator 703 is omitted in FIG. 10. This is the same in FIG. 11 and FIG. 12 which will be referred later.

Specifically, the film door 705 of the switching valve 70 has a sheet shape. The film door 705 is configured to increase and decrease the opening degree of the duct interior channel 60a by moving slidably as shown by an arrow AR1. For example, the film door 705 has an edge extending in a sliding direction of the film door 705 and the edge is guided by the air guiding duct 60 in order to move the film door 705 slidably.

In FIG. 10, the film door 705 that minimizes the opening degree of the duct interior channel 60a in a range of motion of the film door 705 is illustrated with a solid line, and the film door 705 that maximizes the opening degree of the duct interior channel 60a is illustrated with a two-dot chain line.

The present embodiment can provide the same effects that are provided by the common configuration as the first embodiment.

Fourth Embodiment

A fourth embodiment will be described hereafter. In the present embodiment, features that are different from the first embodiment will be described mainly.

Figure 11:
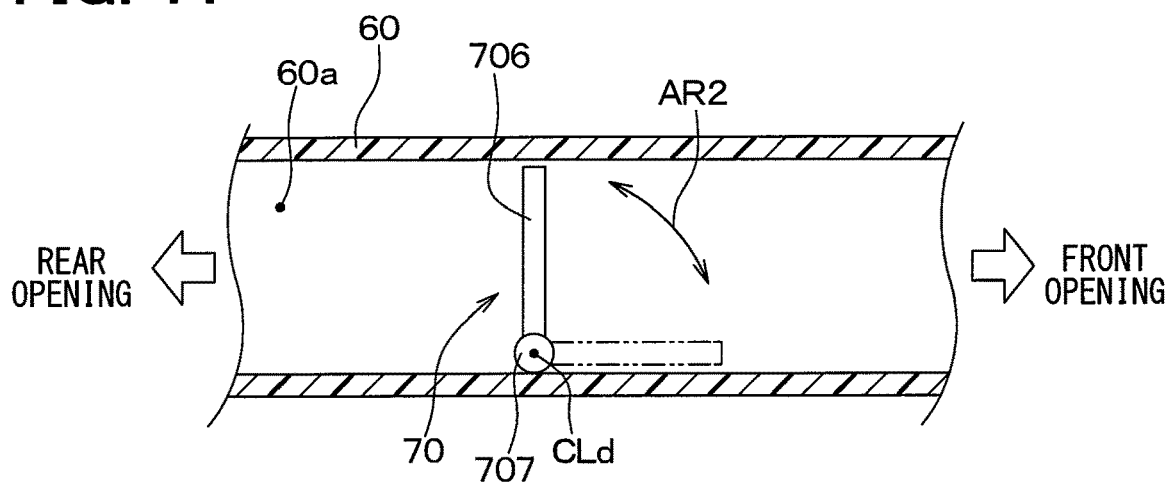
FIG. 11 is a cross-sectional view taken along a line corresponding to the line VI-VI shown in FIG. 3 and illustrating an air guiding duct and a switching valve relating to a fourth embodiment, FIG. 11 corresponding to FIG. 7 relating to the first embodiment.

FIG. 11 is a cross-sectional view taken along a line corresponding to the line VI-VI shown in FIG. 3 and illustrating an air guiding duct and a switching valve relating to a fourth embodiment, FIG. 11 corresponding to FIG. 7 relating to the first embodiment. As shown in FIG. 11, the air guiding duct 60 is not provided with the opening hole 60f illustrated in FIG. 7, and the switching valve 70 has a rotary door 706 and a door shaft 707 illustrated in FIG. 11 instead of the rotary door 701 and the door shaft 702 illustrated in FIG. 7. These aspects are the differences from the first embodiment.

Specifically, the rotary door 706 of the switching valve 70 has a plate shape and is housed in the air guiding duct 60. The door shaft 707 has an elongated shape such as a columnar shape and is located inside the duct interior channel 60a. Specifically, when the duct interior channel 60a has one end and an other end facing each other in a direction intersecting with the flow direction of the air flowing in the duct interior channel 60a, the door shaft 707 is located adjacent to the one end or the other end.

The rotary door 706 extends from the door shaft 707 in a radial direction of the door shaft 707 on one side of the door shaft 707. The radial direction of the door shaft 707 intersects with the flow direction of the air flowing in the duct interior channel 60a. That is, the rotational axis CLd coincides with a center axis of the door shaft 707, and one end side of the rotary door 706 is attached to the door shaft 707.

The rotary door 706 rotates about the rotational axis CLd inside the air guiding duct 60 as shown by an arrow AR2, thereby increasing and decreasing the opening degree of the duct interior channel 60a. In FIG. 11, the rotary door 706 that minimizes the opening degree of the duct interior channel 60a in a range of motion of the rotary door 706 is illustrated by a solid line, and the rotary door 706 that maximizes the opening degree of the duct interior channel 60a is illustrated by a two-dot chain line.

The present embodiment can provide the same effects that are provided by the common configuration as the first embodiment.

Fifth Embodiment

A fifth embodiment will be described hereafter. In the present embodiment, features that are different from the first embodiment will be described mainly.

Figure 12:
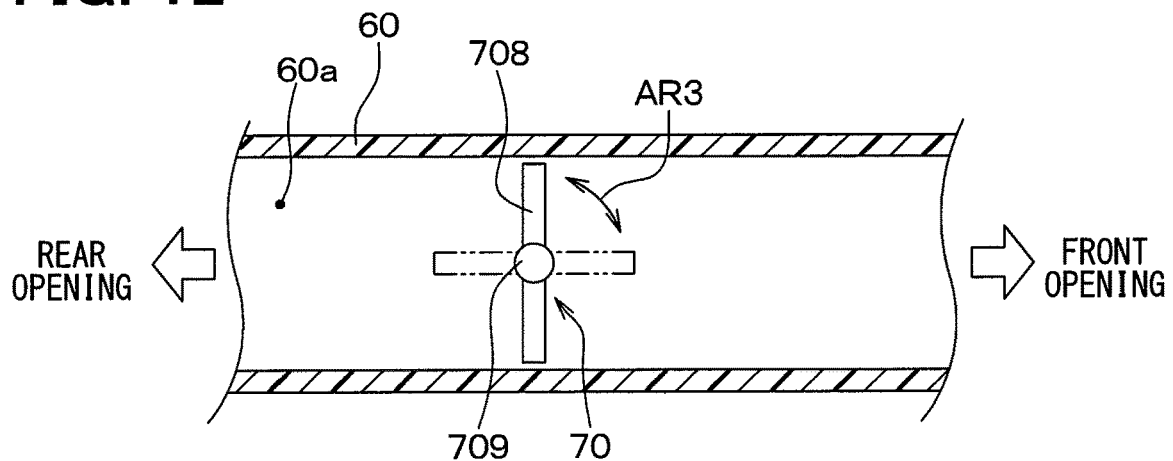
FIG. 12 is a cross-sectional view taken along a line corresponding to the line VI-VI shown in FIG. 3 and illustrating an air guiding duct and a switching valve relating to a fifth embodiment, FIG. 12 corresponding to FIG. 7 relating to the first embodiment.

FIG. 12 is a cross-sectional view taken along a line corresponding to the line VI-VI shown in FIG. 3 and illustrating the air guiding duct 60 and the switching valve 70 relating to the fifth embodiment, FIG. 12 corresponding to FIG. 7 relating to the first embodiment. As shown in FIG. 12, the air guiding duct 60 is not provided with the opening hole 60f illustrated in FIG. 7, and the switching valve 70 has a rotary door 708 and a door shaft 709 instead of the rotary door 701 and the door shaft 702 illustrated in FIG. 7. These aspects are the differences from the first embodiment.

The rotary door 708 of the switching valve 70 has a plate shape and is housed in the air guiding duct 60. The door shaft 709 has an elongated shape such as a columnar shape and is located at a center of the duct interior channel 60a in the direction intersecting with the flow direction of air flowing in the duct interior channel 60a.

The rotary door 708 is located inside the air guiding duct 60 and extends across the duct interior channel 60a in a radial direction of the door shaft 709. The radial direction of the door shaft 709 intersects with the rotational axis CLd. That is, the rotational axis CLd coincides with a center axis of the door shaft 709, and the door shaft 709 is attached to a center portion of the rotary door 708.

The rotary door 708 rotates about the rotational axis CLd inside the air guiding duct 60 as shown by an arrow AR3, thereby increasing and decreasing the opening degree of the duct interior channel 60a. In FIG. 12, the rotary door 708 that minimizes the opening degree of the duct interior channel 60a in a range of motion of the rotary door 708 is illustrated with a solid line, and the rotary door 708 that maximizes the opening degree of the duct interior channel 60a is illustrated with a two-dot chain line.

The present embodiment can provide the same effects that are provided by the common configuration as the first embodiment.

MODIFICATIONS (1) The engine room opening 2 is provided in the front grille 4 of the car 12 according to the above-described embodiments, however may be defined to open to a lower-front surface of a bumper of the car 12.

(2) The cooling module 10 has the radiator 30 serving as the engine cooling heat exchanger according to the above-described embodiments. However, the engine cooling heat exchanger may be an oil cooler that is configured to cool an engine oil serving as the heat medium.

(3) The air guiding duct 60 is located above the engine 16 inside the engine room 14 according to the above-described embodiments, however is not limited to be located above the engine 16.

(4) The engine room opening 2 is located on the front side of the radiator 30 according to the above-described embodiments. For example, the engine room opening 2 and the radiator 30 may be misaligned in the lateral direction DR2.

(5) The exhaust manifold 18 is located on the rear side of the engine 16 inside the engine room 14, however is not limited to be located on the rear side of the engine 16.

(6) The electric fan 40 is an axial fan according to the above-described embodiments, however may be a centrifugal fan.

(7) The condenser 20, the radiator 30, and the electric fan 40 are arranged in this order from the front side according to the above-described embodiments, however, the order is not limited.

(8) The switching valve 70 is located between the front opening 61 and the rear opening 62 inside the air guiding duct 60 according to the above-described embodiments. However, the switching valve 70 may be located in the front opening 61 or the second opening 62.

The present disclosure is not limited to the above-described embodiments. The present disclosure also includes various modifications and modifications in a range of the equivalent. In the above-described embodiments, it is to be understood that elements constituting the embodiments are not necessary except for a case of being explicitly specified to be necessary and a case of being considered to be absolutely necessary in principle. Even when a factor such as a quantity of elements, a value, an amount, a range is mentioned in the above-described embodiments, it is to be understood that the factor is not limited to a specific value except for a case of being explicitly specified to be necessary and a case of being considered to be absolutely necessary in principle. Even when a feature such as a material forming a member, a shape of a member, a positional relation of members, it is to be understood that such feature is not limited to a specific material, shape, positional relation, or the like except for a case of being explicitly specified to be necessary and a case of being considered to be absolutely necessary in principle.

The invention claimed is:

1. An air guiding unit that is mounted to a vehicle having an engine housed in an engine room, the engine room having an engine room opening that is open toward a front side of the vehicle, the engine room into which an air flows from the engine room opening, the air guiding unit comprising:
   a shroud that combines a radiator, an engine cooling heat exchanger, and a blower, the radiator configured as a part of an air conditioner system, the engine cooling heat exchanger and the blower configured to cool the engine, the shroud guiding air flowing from the engine room opening and passing through the radiator and the engine cooling heat exchanger, the shroud having a vent hole;
   an air guiding duct that has a first opening, a second opening, and a duct interior channel, the first opening connected to the vent hole of the shroud to open through the vent hole, the second opening open in the engine room toward a rear space defined on a rear side of the engine, the duct interior channel that is defined between the first opening and the second opening, the duct interior channel through which the air flows between the first opening and the second opening; and
   a valve that is mounted to the air guiding duct and is configured to increase and decrease an opening degree of the duct interior channel,
   wherein the valve is located between the first opening and the second opening in the air guiding duct,
   wherein the air guiding duct has an opening hole that is defined between the first opening and the second opening in the air guiding duct, the opening hole through which the duct interior channel and an outside of the air guiding duct communicate with each other, wherein the duct interior channel has a hole forming portion where the opening hole of the air guiding duct is defined and a second-opening-side portion located between the hole forming portion and the second opening, and the valve is configured to increase an opening degree of the opening hole with respect to the second-opening-side portion while decreasing the opening degree of the duct interior channel.

2. The air guiding unit according to claim 1, wherein
the valve has a rotary door that rotates in the air guiding duct and closes the opening hole inside the air guiding duct, and the rotary door rotates about a rotational axis that is located between the opening hole and a first-opening-side portion of the duct interior channel and intersects with the duct interior channel.

3. The air guiding unit according to claim 1, wherein
the valve has a rotary door that rotates in the air guiding duct and closes the opening hole inside the air guiding duct, the rotary door is provided separately from the air guiding duct, and the air guiding duct has a joint that is attached to the rotary door and supports the rotary door to be rotatable about a rotational axis that is located between the opening hole and a first-opening-side portion of the duct interior channel and intersects with the duct interior channel.

4. The air guiding unit according to claim 1, wherein
the valve has a rotary door that rotates in the air guiding duct and closes the opening hole inside the air guiding duct, the rotary door has a flexible portion that is connected to the air guiding duct and has a flexibility, the flexible portion configuring a part of a periphery of the rotary door, the rotary door and the air guiding duct are combined to each other through the flexible portion, and the rotary door is rotated due to a deformation of the flexible portion.

5. The air guiding unit according to claim 2, wherein
the air guiding duct has an inner wall that defines the duct interior channel, the rotary door has a wall connection portion that is configured to be in contact with the inner wall when the rotary door minimizes the opening degree of the duct interior channel in a range of motion of the rotary door, and the wall connection portion has an elasticity.

6. A cooling module comprising the air guiding unit, the engine cooling heat exchanger, the blower, and the radiator according to claim 1.

* * * * *